(12) United States Patent
Escale et al.

(10) Patent No.: US 11,142,619 B2
(45) Date of Patent: Oct. 12, 2021

(54) LIQUID COMPOSITION OR SYRUP COMPRISING A MULTISTAGE POLYMER AND A (METH)ACRYLIC POLYMER, SYRUP FOR IMPREGNATION PROCESS, IMPREGNATION PROCESS FOR A FIBROUS SUBSTRATE, A METHOD OF POLYMERIZATION AND STRUCTURED ARTICLE OBTAINED THEREOF

(71) Applicant: Arkema France, Colombes (FR)

(72) Inventors: Pierre Escale, Pau (FR); Pierre Gerard, Denguin (FR); Aline Couffin, Balsac (FR); Raber Inoubli, Villeurbanne (FR); Philippe Hajji, Chatillon D'Azergues (FR)

(73) Assignee: ARKEMA FRANCE, Colombes (FR)

( * ) Notice: Subject to any disclaimer, the term of this patent is extended or adjusted under 35 U.S.C. 154(b) by 186 days.

(21) Appl. No.: 16/311,760

(22) PCT Filed: Jun. 29, 2017

(86) PCT No.: PCT/EP2017/066201
§ 371 (c)(1),
(2) Date: Dec. 20, 2018

(87) PCT Pub. No.: WO2018/002260
PCT Pub. Date: Jan. 4, 2018

(65) Prior Publication Data
US 2019/0233603 A1    Aug. 1, 2019

(30) Foreign Application Priority Data
Jun. 29, 2016 (FR) ...................................... 1656099

(51) Int. Cl.
| | | |
|---|---|---|
| C08J 5/24 | (2006.01) | |
| C08F 265/06 | (2006.01) | |
| C08J 5/04 | (2006.01) | |
| C08F 285/00 | (2006.01) | |
| C08L 33/10 | (2006.01) | |
| C08L 33/08 | (2006.01) | |

(52) U.S. Cl.
CPC ............... *C08J 5/24* (2013.01); *C08F 265/06* (2013.01); *C08F 285/00* (2013.01); *C08J 5/04* (2013.01); *C08L 33/08* (2013.01); *C08L 33/10* (2013.01); *C08F 2500/02* (2013.01); *C08F 2500/12* (2013.01); *C08F 2500/17* (2013.01); *C08F 2500/21* (2013.01); *C08J 2333/08* (2013.01); *C08J 2333/10* (2013.01); *C08J 2347/00* (2013.01)

(58) Field of Classification Search
CPC ................................. C08J 5/24; C08F 2500/17
See application file for complete search history.

(56) References Cited

U.S. PATENT DOCUMENTS

| 5,847,036 | A  | * | 12/1998 | Takabatake | ........... | C08F 265/04 |
| | | | | | | 524/321 |
| 6,258,887 | B1 | * | 7/2001 | Bardman | .............. | C08F 263/04 |
| | | | | | | 524/521 |
| 6,664,314 | B1 | * | 12/2003 | Hajek | ................... | C08F 265/06 |
| | | | | | | 523/218 |
| 9,296,845 | B2 | | 3/2016 | Choi et al. | | |
| 2002/0173589 | A1 | * | 11/2002 | Kawabata | ............. | C08F 291/02 |
| | | | | | | 525/63 |
| 2004/0091805 | A1 | * | 5/2004 | Qian | ................... | G03G 9/08795 |
| | | | | | | 430/109.1 |
| 2013/0287980 | A1 | * | 10/2013 | Burdzy | ..................... | C09K 3/10 |
| | | | | | | 428/35.7 |
| 2014/0062121 | A1 | * | 3/2014 | Benz | ....................... | B32B 27/06 |
| | | | | | | 296/84.1 |
| 2015/0218362 | A1 | * | 8/2015 | Gerard | ....................... | C08J 5/24 |
| | | | | | | 524/257 |
| 2016/0009878 | A1 | * | 1/2016 | Gerard | ................ | D06M 15/263 |
| | | | | | | 523/219 |
| 2016/0017138 | A1 | * | 1/2016 | Gerard | ....................... | C08J 5/24 |
| | | | | | | 525/94 |

FOREIGN PATENT DOCUMENTS

| JP | 2004123897 A | * | 4/2004 |
| WO | WO 2017/121749 A1 | | 7/2017 |
| WO | WO 2017/121750 A1 | | 7/2017 |

* cited by examiner

*Primary Examiner* — Mark S Kaucher
(74) *Attorney, Agent, or Firm* — Buchanan Ingersoll & Rooney P.C.

(57) ABSTRACT

The present invention relates to a liquid composition comprising a monomer, a (meth)acrylic polymer and a multistage polymer. In particular the present invention it relates to a liquid composition comprising a monomer, a (meth)acrylic polymer and a multistage polymer that can be used as a syrup and especially as a syrup for impregnation and for the preparation of for reinforcing the impact strength of a thermoplastic material obtained after polymerization of the syrup. The invention also relates to a process for manufacturing such a syrup. The invention also relates to a process for impregnating a fibrous substrate of long fibers with said viscous liquid syrup. The invention also relates to a fibrous substrate preimpregnated with said syrup which is useful for manufacturing composite parts. More particularly the present invention relates also to a process for preparing a liquid composition comprising a (meth)acrylic monomer, a (meth) acrylic polymer and a multistage polymer.

26 Claims, No Drawings

LIQUID COMPOSITION OR SYRUP COMPRISING A MULTISTAGE POLYMER AND A (METH)ACRYLIC POLYMER, SYRUP FOR IMPREGNATION PROCESS, IMPREGNATION PROCESS FOR A FIBROUS SUBSTRATE, A METHOD OF POLYMERIZATION AND STRUCTURED ARTICLE OBTAINED THEREOF

This application claims benefit, under U.S.C. § 119 or § 365 of PCT Application Number PCT/EP2017/066201, filed Jun. 29, 2017, and French Patent Application Number FR16.56099, filed Jun. 29, 2016, these documents being incorporated herein by reference.

FIELD OF THE INVENTION

The present invention relates to a liquid composition comprising a monomer, a (meth)acrylic polymer and a multistage polymer.

In particular the present invention it relates to a liquid composition comprising a monomer, a (meth)acrylic polymer and a multistage polymer that can be used as a syrup and especially as a syrup for impregnation and for the preparation of for reinforcing the impact strength of a thermoplastic material obtained after polymerization of the syrup. The invention also relates to a process for manufacturing such a syrup. The invention also relates to a process for impregnating a fibrous substrate of long fibers with said viscous liquid syrup. The invention also relates to a fibrous substrate preimpregnated with said syrup which is useful for manufacturing composite parts.

More particularly the present invention relates also to a process for preparing a liquid composition comprising a (meth)acrylic monomer, a (meth)acrylic polymer and a multistage polymer.

Technical Problem

Impact modifiers are widely used to improve the impact strength for polymeric compositions with the aim to compensate their inherent brittleness or the embrittlement that occurs at ambient temperature but also and especially sub-zero temperatures, notch sensitivity and crack propagation. So an impact modified polymer is a polymeric material whose impact resistance and toughness have been increased by the incorporation of phase micro domains of a rubbery material.

This is usually done due to the introduction of microscopic rubber particles into the polymer matrix that can absorb the energy of an impact or dissipate it. One possibility is to introduce the rubber particles in form of core-shell particles. These core-shell particles that possess very generally a rubber core and a polymeric shell, having the advantage of a proper particle size of the rubber core for effective toughening and the grafted shell in order to have the adhesion and compatibility with the thermoplastic matrix.

The performance of the impact modification is a function of the particles size, especially of the rubber part of the particle, and its quantity. There is an optimal average particle size in order to have the highest impact strength for a given quantity of added impact modifier particles.

These primary impact modifier particles are usually added in form of powder particles to the polymeric material. These powder particles are agglomerated primary impact modifier particles. During the blending of the thermoplastic material with the powder particles the primary impact modifier particles are regained and are dispersed more or less homogenously dispersed in the thermoplastic material.

While the particle size of the impact modifier particles in the range of nanometers, the range of the agglomerated powder particles is in the range of micrometers. Latter is much easier for handling.

For many polymers, thermoplastic or thermoset polymers it is very difficult or nearly impossible to disperse correctly these multistage polymer in form of core shell particles as agglomerated dry powders. An ideal homogenous dispersion of the core-shell particle has no agglomerates after the dispersion in the thermoplastic material also called matrix.

This is even more difficult if the multistage polymers should be homogenously distributed in a polymeric matrix which comprises also a fibrous substrate as for example fibre reinforced polymeric composites and especially thermoplastic polymeric composites.

The fibrous substrate is usually impregnated by a liquid composition, either a molten polymer or a liquid composition comprising monomers, oligomers and/or polymers.

In a liquid composition the impact modifier particles can swell, increasing their effective volume and in the end the viscosity of the liquid composition. In order to have a liquid composition with a sufficient fluidity for the application it is necessary to limit the quantity of impact modifier particles in the liquid composition, yielding to worse or not sufficient impact performance.

The objective of the present invention is to obtain liquid composition comprising a monomer, a (meth)acrylic polymer and a multistage polymer, with a homogenous dispersion of the multistage polymer in order to have a liquid composition with a sufficient high ratio of multistage polymer for impact performance once polymerized and a sufficient low viscosity for using the liquid composition.

An objective of the present invention is also to have a liquid composition comprising a monomer, a (meth)acrylic polymer and a multistage polymer, with a homogenous dispersion of the multistage polymer and a sufficient low viscosity, that can be used in an impregnation process and/or a polymerization process.

Another objective of the present invention is to avoid or reduce significantly the agglomeration of multistage polymer in the composition.

Still an additional objective is having a process for preparing a liquid composition comprising a (meth)acrylic monomer, a (meth)acrylic polymer and a multistage polymer, with a homogenous dispersion of the multistage polymer.

Still a further objective is the use of the composition comprising a monomer, a (meth)acrylic polymer for the impact modification of polymers and especially polymer composites.

Still a further objective is to obtain liquid composition comprising a monomer, a (meth)acrylic polymer and a multistage polymer, with a homogenous dispersion of the multistage polymer as impregnation liquid for a fibrous substrate or the use the liquid composition in an impregnation process for impregnating a fibrous substrate.

Still another objective of the present invention is to wet completely, correctly and in a homogenous way a fibrous substrate during impregnation with a liquid composition comprising monomer, a (meth)acrylic polymer and a multistage polymer in order to obtain an impact modified composite material after the polymerization of the monomer.

BACKGROUND OF THE INVENTION

Prior Art

The document WO2014/013028 discloses an impregnation process for a fibrous substrate, a liquid (meth) acrylic syrup for the impregnation process, its method of polymerization and structured article obtained thereof. The syrup comprises a (meth)acrylic monomer, a (meth)acrylic polymer and optionally impact modifier in the form of fine particles between 0 and 20 wt %.

The document WO2014/135815 discloses an impregnation process for a fibrous substrate, a liquid (meth) acrylic syrup for the impregnation process, its method of polymerization and structured article obtained thereof. The syrup comprises a (meth)acrylic monomer, a (meth)acrylic polymer and impact modifier in the form of a blockcopolymer.

None of the prior art documents discloses such a liquid composition or a process for obtaining it or its use.

BRIEF DESCRIPTION OF THE INVENTION

Surprisingly it has been found that a liquid composition comprising
- a) a (meth)acrylic polymer (P1),
- b) a multistage polymer and
- c) a monomer (M1) chosen from a (meth) acrylic monomer or a vinyl monomer or mixture thereof, characterized that said liquid (meth)acrylic syrup is having a dynamic viscosity at 20° C. between 10 mPa·s and 200 000 mPa·s and that the (meth) acrylic polymer (P1) has a mass average molecular weight Mw of less than 100 000 g/mol, is less viscous than a composition not comprising the (meth)acrylic polymer (P1) at same weight quantity of multistage polymer.

Surprisingly it has also been found that a liquid composition comprising
- a) a (meth)acrylic polymer (P1),
- b) a multistage polymer and
- c) a monomer (M1) chosen from a (meth) acrylic monomer or a vinyl monomer or mixture thereof, characterized that said liquid (meth)acrylic syrup is having a dynamic viscosity at 20° C. between 10 mPa·s and 200 000 mPa·s and that the (meth) acrylic polymer (P1) has a mass average molecular weight Mw of less than 100 000 g/mol, possesses a better dispersion of the multistage polymer than a composition not comprising the (meth)acrylic polymer (P1).

Surprisingly it has also been found that a liquid composition comprising
- a) a (meth)acrylic polymer (P1),
- b) a multistage polymer and
- c) a monomer (M1) chosen from a (meth) acrylic monomer or a vinyl monomer or mixture thereof, characterized that said liquid (meth)acrylic syrup is having a dynamic viscosity at 20° C. between 10 mPa·s and 200 000 mPa·s and that the (meth) acrylic polymer (P1) has a mass average molecular weight Mw of less than 100 000 g/mol, can be used as liquid (meth)acrylic syrup for impregnating a fibrous substrate, said fibrous substrate consisting of long fibers.

Surprisingly it has also been found that a process for manufacturing a liquid composition comprising the steps of
- a) preparing a composition comprising a (meth) acrylic polymer (P1) having a mass average molecular weight Mw of less than 100 000 g/mol and a multi stage polymer,
- b) mixing the composition of previous step with a monomer (M1) chosen from a (meth) acrylic monomer or a vinyl monomer or mixture thereof;

wherein the liquid composition is having a dynamic viscosity at 20° C. between 10 mPa·s and 200 000 mPa·s, yields to a liquid composition that is less viscous than a composition not comprising the (meth)acrylic polymer (P1) at same weight quantity of multistage polymer.

Surprisingly it has also been found that a liquid composition comprising
- a) a (meth)acrylic polymer (P1),
- b) a multistage polymer and
- c) a monomer (M1) chosen from a (meth) acrylic monomer or a vinyl monomer or mixture thereof, characterized that said liquid (meth)acrylic syrup is having a dynamic viscosity at 20° C. between 10 mPa·s and 200 000 mPa·s and that the (meth) acrylic polymer (P1) has a mass average molecular weight Mw of less than 100 000 g/mol, can be used for manufacturing mechanical or structured parts or articles comprising an impact modified polymer composite material.

DETAILED DESCRIPTION OF THE INVENTION

According to a first aspect, the present invention relates to a liquid composition comprising
- a) a (meth)acrylic polymer (P1),
- b) a multistage polymer and
- c) a monomer (M1) chosen from a (meth) acrylic monomer or a vinyl monomer or mixture thereof, characterized that said liquid (meth)acrylic syrup is having a dynamic viscosity at 20° C. between 10 mPa·s and 200 000 mPa·s and that the (meth) acrylic polymer (P1) has a mass average molecular weight Mw of less than 100 000 g/mol.

According to a second aspect, the present invention relates to liquid (meth)acrylic syrup for impregnating a fibrous substrate, said fibrous substrate consisting of long fibers, said syrup being characterized in that it comprises:
- a) a (meth)acrylic polymer (P1),
- b) a multistage polymer and
- c) a monomer (M1) chosen from a (meth) acrylic monomer or a vinyl monomer or mixture thereof, characterized that said liquid (meth)acrylic syrup is having a dynamic viscosity at 20° C. between 10 mPa·s and 200 000 mPa·s and that the (meth) acrylic polymer (P1) has a mass average molecular weight Mw of less than 100 000 g/mol.

In a third aspect the present invention relates to a process for manufacturing a liquid composition comprising the steps of
- a) preparing a composition comprising a (meth) acrylic polymer (P1) having a mass average molecular weight Mw of less than 100 000 g/mol and a multi stage polymer,
- b) mixing the composition of previous step with a monomer (M1) chosen from a (meth) acrylic monomer or a vinyl monomer or mixture thereof;

wherein the liquid composition is having a dynamic viscosity at 20° C. between 10 mPa·s and 200 000 mPa·s.

In a fourth aspect the present invention relates to the use a liquid composition comprising
- a) a (meth)acrylic polymer (P1),
- b) a multi stage polymer and
- c) a monomer (M1) chosen from a (meth) acrylic monomer or a vinyl monomer or mixture thereof;

characterized that said liquid (meth)acrylic syrup is having a dynamic viscosity at 20° C. between 10 mPa·s and 200 000 mPa·s and that the (meth) acrylic polymer (P1) has a mass average molecular weight Mw of less than 100 000 g/mol, for impregnating a fibrous substrate.

In a fifth aspect the present invention relates to the use a liquid composition comprising
  a) a (meth)acrylic polymer (P1),
  b) a multi stage polymer and
  c) a monomer (M1) chosen from a (meth) acrylic monomer or a vinyl monomer or mixture thereof;
characterized that said liquid (meth)acrylic syrup is having a dynamic viscosity at 20° C. between 10 mPa·s and 200 000 mPa·s and that the (meth) acrylic polymer (P1) has a mass average molecular weight Mw of less than 100 000 g/mol, in a process for manufacturing mechanical or structured parts or articles comprising an impact modified polymer composite material.

By the term "polymer powder" as used is denoted a polymer comprising powder grain in the range of at least 1 micrometer (μm) obtained by agglomeration of primary polymer comprising particles in the nanometer range.

By the term "primary particle" as used is denoted a spherical polymer comprising particle in the nanometer range. Preferably the primary particle has a weight average particle size between 20 nm and 800 nm.

By the term "particle size" as used is denoted the volume average diameter of a particle considered as spherical.

By the term "copolymer" as used is denoted that the polymer consists of at least two different monomers.

By "multistage polymer" as used is denoted a polymer formed in sequential fashion by a multi-stage polymerization process. One preferred process is a multi-stage emulsion polymerization process in which the first polymer is a first-stage polymer and the second polymer is a second-stage polymer, i.e., the second polymer is formed by emulsion polymerization in the presence of the first emulsion polymer.

By the term "(meth)acrylic monomer" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "impact modifier" as used is understood a material that once incorporated in a polymeric material increases the impact resistance and toughness of that polymeric material by phase micro domains of a rubbery material or rubber polymer.

By the term "rubber" as used is denoted to the thermodynamic state of the polymer above its glass transition.

By the term "rubber polymer" as used is denoted a polymer that has a glass transition temperature (Tg) below 0° C.

By the term "polymer composite" as used is denoted a multicomponent material comprising multiple different phase domains in which at least one type of phase domain is a continuous phase and in which at least one component is a polymer.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

The liquid composition or liquid (meth)acrylic syrup according of the invention comprises at least three components a) a (meth)acrylic polymer (P1), b) a multi stage polymer, c) a (meth)acrylic monomer (M1), wherein the multistage polymer to monomer ratio by weight in the liquid composition is between 1/99 and 25/75, in the liquid composition comprising the three compounds.

Preferably the multistage polymer to monomer (M1) ratio by weight in the liquid composition is between 2/98 and 24/76, more preferably between 3/97 and 23/77, still more preferably between 4/96 and 22/78 and advantageously between 5/95 and 20/80.

The dynamic viscosity of the liquid composition or liquid (meth)acrylic syrup according to the invention is in a range from 10 mPa*s to 200 000 mPa*s, preferably from 10 mPa*s to 100 000 mPa*s, more preferably from 10 mPa*s to 50 000 mPa*s, still more preferably from 20 mPa*s to 25 000 mPa*s, advantageously from 20 mPa*s to 20 000 mPa*s and most advantageously from 20 mPa*s to 15 000 mPa*s. The viscosity of the liquid composition (sometimes also called syrup) can be easily measured with a Rheometer with a shear rate between 0.1 s−1 and 100 s−1. The dynamic viscosity is measured at 20° C. If there is a shear thinning the viscosity is measured at a shear rate of is-1. Preferably the liquid composition or liquid (meth)acrylic syrup according to the invention shows a shear thinning behaviour.

The weight quantity of the multistage polymer relatively to the monomer (M1) in the liquid composition or liquid (meth)acrylic syrup is between 1 wt % and 40 wt %, based on the sum of the two compounds b) and c), preferably between 2 wt % and 35 wt %, more preferably between 5 wt % and 30 wt %, advantageously between 10 wt % and 30 wt %.

The weight ratio of the (meth)acrylic polymer (P1) relatively to the monomer (M1) the liquid composition or liquid (meth)acrylic syrup between 0.05 wt % and 36 wt % based on the sum of the two compounds a) and c), preferably between 0.1 wt % and 27 wt %.

The weight ratio of the two polymers, the multistage polymer and the (meth)acrylic polymer (P1) together, in the liquid composition or syrup is between 1.05 wt % and 50 wt % based on the sum of the three compounds a), b) and c), preferably between 2.05 wt % and 40 wt %.

The liquid composition or syrup can comprise also other polymers (P2), which are not the multistage polymer or the (meth)acrylic polymer (P1) of the composition according to the invention.

The polymer (P2) is preferably a thermoplastic polymer. More preferably the polymer (P2) is a homo- or copolymer of methyl methacrylate (MMA) comprises at least 70%, preferably at least 80% of methyl methacrylate.

The weight average molecular weight of the polymer (P2) should be high, meaning larger than 50 000 g/mol, more preferably larger than 75 000 g/mol preferably larger than 100 000 g/mol.

With regard to the (meth)acrylic polymer (P1), it has a mass average molecular weight Mw of less than 100 000 g/mol, preferably less than 90 000 g/mol, more preferably less than 80 000 g/mol, still more preferably less than 70 000 g/mol, advantageously less than 60 000 g/mol, more advantageously less than 50 000 g/mol and still more advantageously less than 40 000 g/mol.

The (meth)acrylic polymer (P1), it has a mass average molecular weight Mw above 2 000 g/mol, preferably above 3000 g/mol, more preferably above 4000 g/mol, still more preferably above 5 000 g/mol, advantageously above 6 000 g/mol, more advantageously above 6 500 g/mol and still more advantageously above 7 000 g/mol and most advantageously above 10 000 g/mol.

The mass average molecular weight Mw of (meth)acrylic polymer (P1) is between 2 000 g/mol and 100 000 g/mol, preferable between 3 000 g/mol and 90 000 g/mol and more preferably between 4 000 g/mol and 80 000 g/mol advantageously between 5000 g/mol and 70 000 g/mol, more advantageously between 6 000 g/mol and 50 000 g/mol and most advantageously between 10 000 g/mol and 40 000 g/mol.

Preferably the (meth)acrylic polymer (P1) is a copolymer comprising (meth)acrylic monomers. More preferably the (meth)acrylic polymer (P1) is a (meth) acrylic polymer. Still more preferably the (meth)acrylic polymer (P1) comprises at least 50 wt % monomers chosen from C1 to C12 alkyl (meth)acrylates. Advantageously preferably the (meth) acrylic polymer (P1) comprises at least 50 wt % of monomers chosen from C1 to C4 alkyl methacrylate and C1 to C8 alkyl acrylate monomers and mixtures thereof. More advantageously the (meth)acrylic polymer (P1) comprises at least 50 wt % of polymerized methyl methacrylate, and even more advantageously at least 60 wt % and most advantageously at least 65 wt %.

Preferably the glass transition temperature Tg of the (meth)acrylic polymer (P1) is between 30° C. and 150° C. The glass transition temperature of the (meth)acrylic polymer (P1) is more preferably between 40° C. and 150° C., advantageously between 45° C. and 150° C. and more advantageously between 50° C. and 150° C.

Preferably the polymer (meth)acrylic polymer (P1) is not crosslinked.

Preferably the polymer (meth)acrylic polymer (P1) is not grafted on any other polymer or polymers.

Preferably the (meth)acrylic polymer (P1) has a melt flow index (MFI) according to ISO 1133 (230° C./3.8 kg) of at least 5 g/10 min, preferably at least 6 g/10 min, more preferably at least 7 g/10 min and most preferably at least 8 g/10 min.

More preferably the (meth)acrylic polymer (P1) has a melt flow index (MFI) according to ISO 1133 (230° C./3.8 kg) according to between 5 g/10 min and 100 g/10 min, preferably melt flow index is between 6 g/10 min and 90 g/10 min, more preferably between 7 g/10 min and 80 g/10 min, advantageously between 8 g/10 min and 70 g/10 min.

In a first preferred embodiment the (meth)acrylic polymer (P1) comprises from 50 wt % to 100 wt % methyl methacrylate, preferably from 80 wt % to 100 wt % methyl methacrylate, still more preferably from 80 wt % to 99.8 wt % methyl methacrylate and from 0.2 wt % to 20 wt % of an C1 to C8 alkyl acrylate monomer. Advantageously the C1 to C8 alkyl acrylate monomer is chosen from methyl acrylate, ethyl acrylate or butyl acrylate.

In a second preferred embodiment the (meth)acrylic polymer (P1) comprises between 0 wt % and 50 wt % of a functional monomer. Preferably the (meth)acrylic polymer (P1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt %.

Preferably the functional monomer of the second preferred embodiment is a (meth)acrylic monomer. The functional monomer has the formula (1) or (2):

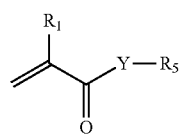

(1)

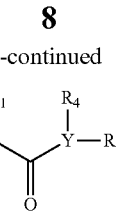

(2)

wherein in both formulas (1) and (2) $R_1$ is chosen from H or $CH_3$; and in formula (1) Y is O, $R_5$ is H or an aliphatic or aromatic radical having at least one atom that is not C or H; and in formula (2) Y is N and $R_4$ and/or $R_3$ is H or an aliphatic or aromatic radical.

Preferably the functional monomer (1) or (2) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10 000 g/mol The multistage polymer according to the invention has at least two stages that are different in its polymer composition.

The multistage polymer is preferably in form of polymer particles considered as spherical particles. These particles are also called core shell particles. The first stage forms the core, the second or all following stages the respective shells. Such a multistage polymer which is also called core/shell particle is preferred.

With regard to the polymeric particle according to the invention, which is the primary particle, it has a weight average particle size (diameter) between 15 nm and 900 nm. Preferably the weight average particle size of the polymer is between 20 nm and 800 nm, more preferably between, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. The primary polymer particles can be agglomerated giving a polymer powder comprising either the multi stage polymer or the (meth) acrylic polymer (P1) and the multi stage polymer.

The polymer particle is obtained by a multistage process such as a process comprising two, three or more stages.

The polymer particle has a multilayer structure comprising at least one layer (A) comprising a polymer (A1) having a glass transition temperature below 0° C. and another layer (B) comprising a polymer (B1) having a glass transition temperature over 30° C.

In a first preferred embodiment the polymer (B1) having a glass transition temperature of at least 30° C. is the external layer of the polymer particle having the multilayer structure.

In a second preferred embodiment the polymer (B1) having a glass transition temperature of at least 30° C. is an intermediate layer of the polymer particle having the multilayer structure, before the multistage polymer is brought into contact with the monomer (M1).

Preferably the stage (A) is the first stage and the stage (B) comprising polymer (B1) is grafted on stage (A) comprising polymer (A1) or another intermediate layer. By first stage is meant that the stage (A) comprising polymer (A1) is made before the stage (B) comprising polymer (B1).

The polymer (A1) having a glass transition temperature below 0° C. in the layer (A) is never made during the last stage of the multistage process. This means that the polymer (A1) is never in the external layer of the particle with the multilayer structure.

The polymer (A1) having a glass transition temperature below 0° C. in the layer (A) is either in the core of the polymer particle or one of the inner layers.

Preferably the polymer (A1) having a glass transition temperature below 0° C. in the layer (A) is made in the first stage of the multistage process forming the core for the polymer particle having the multilayer structure and/or before the polymer (B1) having a glass transition temperature over 60° C. Preferably the polymer (A1) is having a glass transition temperature below −5° C., more preferably below −15° C., advantageously below −25° C.

In a first preferred embodiment the polymer (B1) having a glass transition temperature over 60° C. is made in the last stage of the multistage process forming the external layer of the polymer particle having the multilayer structure.

In a second preferred embodiment the polymer (B1) having a glass transition temperature of at least 30° C. is an intermediate layer of the polymer particle having the multilayer structure, is made in a stage after the stage for forming the polymer (A1) of the multistage process.

There could be additional intermediate layer or layers obtained by an intermediate stage or intermediate stages.

Preferably at least a part of the polymer (B1) of layer (B) is grafted on the polymer made in the previous layer. If there are only two stages (A) and (B) comprising polymer (A1) and (B1) respectively, a part of polymer (B1) is grafted on polymer (A1). More preferably at least 50 wt % of polymer (B1) is grafted. The ratio of grafting can be determined by extraction with a solvent for the polymer (B1) and gravimetric measurement before and after extraction to determine the non-grafted quantity The glass transition temperature Tg of the respective polymers can be estimated for example by dynamic methods as thermo mechanical analysis.

In order to obtain a sample of the respective polymers (A1) and (B1) they can be prepared alone, and not by a multistage process, for estimating and measuring more easily the glass transition temperature Tg individually of the respective polymers of the respective stages.

With regard to the polymer (A1), in a first embodiment it is a (meth) acrylic polymer comprising at least 50 wt % of monomers from alkyl acrylates.

More preferably the polymer (A1) comprises a comonomer or comonomers which are copolymerizable with alkyl acrylate, as long as polymer (A1) is having a glass transition temperature of less than 0° C.

The comonomer or comonomers in polymer (A1) are preferably chosen from (meth)acrylic monomers and/or vinyl monomers.

The (meth)acrylic comonomer in polymer (A1) comprises monomers chosen from C1 to C12 alkyl (meth)acrylates. Still more preferably (meth)acrylic comonomer in polymer (A1) comprises monomers of C1 to C4 alkyl methacrylate and/or C1 to C8 alkyl acrylate monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 0° C.

Preferably the polymer (A1) is crosslinked. This means that a crosslinker is added to the other monomer or monomers. A crosslinker comprises at least two groups that can be polymerized.

In one specific embodiment polymer (A1) is a homopolymer of butyl acrylate.

In another specific embodiment polymer (A1) is a copolymer of butyl acrylate and at least one crosslinker. The crosslinker presents less than 5 wt % of this copolymer.

More preferably the glass transition temperature Tg of the polymer (A1) of the first embodiment is between −100° C. and 0° C., even more preferably between −100° C. and −5° C., advantageously between −90° C. and −15° C. and more advantageously between −90° C. and −25° C.

With regard to the polymer (A1), in a second embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

With regard to the polymer (A1), in a third embodiment the polymer (A1) having a glass transition temperature below 0° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In one embodiment the core is a butadiene homopolymer.

More preferably the glass transition temperature Tg of the polymer (A1) of the third embodiment comprising at least 50 wt % of polymeric units coming from isoprene or butadiene is between −100° C. and 0° C., even more preferably between −100° C. and −5° C., advantageously between −90° C. and −15° C. and even more advantageously between −90° C. and −25° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

The polymer (B1) can be crosslinked.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 30° C.

Advantageously the polymer (B1) comprises at least 50 wt %, more advantageously at least 60 wt % and even more advantageously at least 70 wt % of monomer units coming from methyl methacrylate.

Preferably the glass transition temperature Tg of the polymer (B1) is between 30° C. and 150° C. The glass transition temperature of the polymer (B1) is more preferably between 50° C. and 150° C., still more preferably between 70° C. and 150° C., advantageously between 90° C. and 150° C. and more advantageously between 90° C. and 130° C.

In another embodiment the multi stage polymer as described previously, has an additional stage, which is the (meth)acrylic polymer (P1). The primary polymer particle according to this embodiment of the invention has a multilayer structure comprising at least one stage (A) comprising a polymer (A1) having a glass transition temperature below 0° C., at least one stage (B) comprising a polymer (B1) having a glass transition temperature over 30° C. and at least one stage (P) comprising the (meth)acrylic polymer (P1) having a glass transition temperature between 30° C. and 150° C.

Preferably the (meth)acrylic polymer (P1) is not grafted on any of the polymers (A1) or (B1).

The (meth)acrylic polymer (P1) and the polymer (B1) are not the same polymer, even if their composition could be very close and some of their characteristics are overlapping. The essential difference is that the polymer (B1) is always part of the multistage polymer.

This is more explained in the process for preparing the composition according to the invention comprising the fibrous material, the (meth) acrylic polymer (P1) and the multi stage polymer.

With regard to the process for manufacturing the multistage polymer according to the invention it comprises the steps of
  a) polymerizing by emulsion polymerization of a monomer or monomer mixture ($A_m$) to obtain at least one layer (A) comprising polymer (A1) having a glass transition temperature of less than 0° C.
  b) polymerizing by emulsion polymerization of a monomer or monomer mixture ($B_m$) to obtain layer (B) comprising a polymer (B1) having a glass transition temperature of at least 30° C.
the monomer or monomer mixture ($A_m$) and the monomer or monomer mixture ($B_m$) are chosen from monomers according to the composition for polymer (A1) and polymer (B1) given earlier.

Preferably the step a) is made before step b). More preferably step b) is performed in presence of the polymer (A1) obtained in step a), if there are only two stages.

Still more preferably a graftlinking compound is used in order to graft at least a part of the polymer (B1) of step b) on the polymer (A1) of step a).

Advantageously the process for manufacturing the multistage polymer composition according to the invention is a multistep process comprises the steps one after the other of
  a) polymerizing by emulsion polymerization of a monomer or monomer mixture ($A_m$) to obtain one layer (A) comprising polymer (A1) having a glass transition temperature of less than 0° C.
  b) polymerizing by emulsion polymerization of a monomer or monomer mixture ($B_m$) to obtain layer (B) comprising a polymer (B1) having a glass transition temperature of at least 30° C.

The respective monomers or monomer mixtures ($A_m$) and ($B_m$) for forming the layers (A) and (B) respectively comprising the polymers (A1) and (B1) respectively and the characteristics of the respective polymers (A1) and (B1) are the same as defined before.

Still more advantageously a graftlinking compound is used in order to graft at least a part of the polymer (B1) of step b) on the polymer (A1) of step a).

The process for manufacturing the multistage polymer can comprise additional steps for additional stages between the steps a) and b).

The process for manufacturing the multistage polymer can also comprise additional steps for additional stages before the steps a) and b). A seed could be used for polymerizing by emulsion polymerization the monomer or monomers mixture ($A_m$) to obtain the layer (A) comprising polymer (A1) having a glass transition temperature of less than 0° C. The seed is preferably a thermoplastic polymer having a glass transition temperature of at least 20° C.

The multistage polymer is obtained as an aqueous dispersion of the polymer particles. The solid content of the dispersion is between 10 wt % and 65 wt %.

With regard to the process for manufacturing the (meth) acrylic polymer (P1) according to the invention is comprises the step of polymerizing the respective (meth)acrylic monomers ($P1_m$). The respective (meth)acrylic monomers ($P1_m$) are the same as defined before for the (meth)acrylic polymer (P1) and two preferred embodiments the (meth)acrylic polymer (P1).

The (meth)acrylic homo or copolymer (P1) could be made in batch or semi-continuous process:
  for the batch process, the mixture of monomers is introduced in one shot just before or after introduction of one or part of the initiator system
  for the semi-continuous process, the monomer mixture is added in multiple shots or continuously in parallel to the initiator addition (the initiator is also added in multiple shots or continuously) during a defined period of addition which could be in the range 30 to 500 min.

The process for preparing the polymer composition comprising the (meth) acrylic polymer (P1) and the multi stage polymer has two preferred embodiments.

In a first preferred embodiment of the process, the (meth) acrylic polymer (P1) is polymerized in the presence of the multistage polymer. The (meth) acrylic polymer (P1) is made as an additional stage of the multistage polymer. The (meth) acrylic polymer (P1) is a layer on the multistage polymer and as it is an additional layer it is the outer layer on top of the multistage polymer. The (meth) acrylic polymer (P1) is not grafted on the multistage polymer.

In a second preferred embodiment of the process, the (meth) acrylic polymer (P1) is polymerized apart and mixed or blended with the multistage polymer.

With regard to the process according to the first preferred embodiment for preparing the polymer composition comprising the (meth) acrylic polymer (P1) and the multi stage polymer, it comprises the steps of
  a) polymerizing by emulsion polymerization of a monomer or monomer mixture ($A_m$) to obtain one layer in stage (A) comprising polymer (A1) having a glass transition temperature of less than 0° C.
  b) polymerizing by emulsion polymerization of a monomer or monomer mixture ($B_m$) to obtain layer in stage (B) comprising a polymer (B1) having a glass transition temperature of at least 30° C.
  c) polymerizing by emulsion polymerization of a monomer or monomer mixture ($P1_n$) to obtain a layer in this additional stage comprising the (meth) acrylic polymer (P1) having a glass transition temperature of at least 30° C.

characterized that the (meth) acrylic polymer (P1) has a mass average molecular weight Mw of less than 100 000 g/mol.

Preferably the step a) is made before step b).

More preferably step b) is performed in presence of the polymer (A1) obtained in step a). Still more preferably a graftlinking compound is used in order to graft at least a part of the polymer (B1) of step b) on the polymer (A1) of step a).

Advantageously the method for manufacturing the polymer composition comprising the (meth) acrylic polymer (P1) and the multi stage polymer is a multistep process and comprises the steps one after the other of a) polymerizing by emulsion polymerization of a monomer or monomer mixture ($A_m$) to obtain one layer in stage (A) comprising polymer (A1) having a glass transition temperature of less than 0° C.

b) polymerizing by emulsion polymerization of a monomer or monomer mixture ($B_m$) to obtain layer in stage (B) comprising a polymer (B1) having a glass transition temperature of at least 30° C.

c) polymerizing by emulsion polymerization of a monomer or monomer mixture ($P1_n$) to obtain a layer in this additional stage comprising the (meth) acrylic polymer (P1) having a glass transition temperature of at least 30° C.

characterized that the (meth) acrylic polymer (P1) has a mass average molecular weight Mw of less than 100 000 g/mol.

Still more advantageously a graftlinking compound is used in order to graft at least a part of the polymer (B1) of step b) on the polymer (A1) of step a).

The respective monomers or monomer mixtures ($A_m$), ($B_m$) and ($P1_m$) for forming the layers (A), (B) and additional stage respectively comprising the polymers (A1), (B1) and (P1) respectively, are the same as defined before. The characteristics of the polymers (A1), (B1) and (P1) respectively, are the same as defined before.

Preferably the method for manufacturing the polymer composition comprising the (meth) acrylic polymer (P1) and the multi stage polymer comprises the additional step d) of recovering of this polymer composition.

By recovering is meant partial or separation between the aqueous and solid phase, latter comprises the polymer composition.

More preferably according to the invention the recovering of the polymer composition is made by coagulation or by spray-drying.

Spray drying is the preferred method for the recovering and/or drying for the manufacturing method for a polymer powder composition if the polymer (A1) having a glass transition temperature below 0° C. comprises at least 50 wt % of polymeric units coming from alkyl acrylate and the stage (A) is the most inner layer of the polymer particle having the multilayer structure.

Coagulation is the preferred method for the recovering and/or drying for the manufacturing method for a polymer powder composition according to the present invention if the polymer (A1) having a glass transition temperature below 10° C. comprises at least 50 wt % of polymeric units coming from isoprene or butadiene and the stage (A) is the most inner layer of the polymer particle having the multilayer structure.

The method for manufacturing the polymer composition according to the invention can comprise optionally the additional step e) of drying of the polymer composition.

Preferably the drying step e) is made if the step d) of recovering of the polymer composition is made by coagulation.

Preferably after the drying step an e) the polymer composition comprises less than 3 wt %, more preferably less than 1.5 wt % advantageously less than 1% of humidity or water.

The humidity of a polymer composition can be measure with a thermo balance.

The drying of the polymer can be made in an oven or vacuum oven with heating of the composition for 48 hours at 50° C.

With regard to the process according to the second preferred embodiment for preparing the polymer composition comprising the (meth) acrylic polymer (P1) and the multi stage polymer, it comprises the steps of a) mixing of the (meth) acrylic polymer (P1) and the multi stage polymer b) recovering the obtained mixture of previous step in form of a polymer powder wherein the (meth) acrylic polymer (P1) and the multi stage polymer in step a) are in form of a dispersion in aqueous phase.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at least 5 wt %, preferably at least 10 wt %, more preferably at least 20 wt % and advantageously at least 50 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at most 99 wt %, preferably at most 95 wt % and more preferably at most 90 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is between 5 wt % and 99 wt %, preferably between 10 wt % and 95 wt % and more preferably between 20 wt % and 90 wt %.

The recovering step b) of the process for manufacturing the polymer composition comprising the (meth) acrylic polymer (P1) and the multi stage polymer, is preferably made by coagulation or by spray drying.

The process for manufacturing the polymer composition comprising the (meth) acrylic polymer (P1) and the multi stage polymer can optionally comprise the additional step c) for drying the polymer composition.

By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The process for manufacturing the polymer composition comprising the (meth) acrylic polymer (P1) and the multi stage polymer yields preferably to a polymer powder. The polymer powder of the invention is in form of particles. A polymer powder particle comprises agglomerated primary polymer particles made by multistage process and the (meth) acrylic polymer (P1).

With regard to the polymer powder comprising the (meth) acrylic polymer (P1) and the multi stage polymer according to the two embodiments of the process of preparation, it has a volume median particle size D50 between 1 μm and 500 μm. Preferably the volume median particle size of the polymer powder is between 10 μm and 400 μm, more preferably between 15 μm and 350 μm and advantageously between 20 μm and 300 μm.

The D10 of the particle size distribution in volume is at least 7 μm and preferably 10 μm.

The D90 of the particle size distribution in volume is at most 950 μm and preferably 500 μm, more preferably at most 400 μm.

The weight ratio r of the (meth) acrylic polymer (P1) in relation to the multi stage polymer is at least 5 wt %, more preferably at least 7 wt % and still more preferably at least 10 wt %.

According to the invention the ratio r of the (meth) acrylic polymer (P1) in relation to the multi stage polymer is at most 95 w %.

Preferably the weight ratio of the (meth) acrylic polymer (P1) in relation to the multi stage polymer is between 5 wt % and 95 wt % and preferably between 10 wt % and 90 wt %.

With regard to the monomer (M1) it is a liquid monomer at least in the temperature range between 0° C. and 60° C. The (meth)acrylic monomer (M1) comprises one carbon C=C double bond.

Preferably the monomer (M1) chosen from a (meth) acrylic monomer or a vinyl monomer or mixture thereof.

The monomer (M1) according to the invention is a monomer that is a solvent for the (meth) acrylic polymer (P1). In other word the (meth) acrylic polymer (P1) is soluble in the monomer (M1).

Soluble means that in a certain time the (meth) acrylic polymer (P1) in contact the thermodynamically compatible monomer (M1) is dissolved and a solution of the (meth) acrylic polymer (P1) in the monomer (M1) is obtained.

The solubility of the (meth) acrylic polymer (P1) in the monomer (M1) can be simply tested by mixing under agitation at 25° C. the two compounds. For one skilled in the art the solvents including monomers as monomer (M1) for a large number of polymers are known. On the other hand solubility parameter values are given for a large number of polymer and solvents, latter including a large number of monomers for example in Polymer Handbook (4$^{th}$ edition) Ed. J. Brandrup, E. H. Immergut and E. A. Grulke; Pub.: John Wiley and Sons Inc. 1999, Chapter "Solubility Parameter Value" by Eric A. Gulke VII/675 to VII/714.

The monomer (M1) is preferably chosen from (meth) acrylic monomers and mixtures thereof or therewith, latter comprising at least 50 wt % of (meth)acrylic monomers in the mixture. If the (meth)acrylic monomer (M1) is a mixture of several monomers, the (meth) acrylic polymer (P1) is soluble in the mixture comprising the (meth)acrylic monomer(s) (M1).

The (meth)acrylic monomer (M1) is more preferably chosen from acrylic acid, methacrylic acid, alkyl acrylic monomers, alkyl methacrylic monomers and mixtures thereof.

Still more preferably the (meth)acrylic monomer (M1) is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously the (meth)acrylic monomer (M1) is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

More advantageously the (meth)acrylic monomer (M1) is chosen from methyl methacrylate, isobornyl acrylate or acrylic acid and mixtures thereof.

In a first most advantageously embodiment at least 50 wt %, preferably at least 60 wt % of the (meth)acrylic monomer (M1) is methyl methacrylate.

In a second most advantageously at least 50 wt %, preferably at least 60 wt %, more preferably at least 70 wt % and advantageously at least 80 wt % and even more advantageously 90 wt % of the (meth)acrylic monomer (M1) is a mixture of methyl methacrylate with isobornyl acrylate and/or acrylic acid The liquid composition of the present invention that is less viscous than a composition not comprising the (meth) acrylic polymer (P1).

The liquid composition of the present invention can be used to prepare a better dispersed multistage polymer instead of a composition not comprising the (meth)acrylic polymer (P1).

The liquid composition of the present invention can optionally comprise also as an additional compound d) an initiator or initiating system. The initiator or initiating system is there for starting the polymerization of the monomer (M1).

In one embodiment the composition comprises also compound d) an initiator or initiating system.

The initiator or initiating system can be chosen from the initiator of initiating systems disclosed in WO2013/056845, WO2014/013028, WO2014/174098, FR3030546, FR3030547 and FR 3030585.

Depending on the nature of the initiator or initiating system, it can be added to the liquid composition well before the intended polymerization or just a few moments before the polymerization.

With regard to the process for manufacturing the liquid composition is comprises the steps of
a) preparing a composition comprising a (meth) acrylic polymer (P1) having a mass average molecular weight Mw of less than 100 000 g/mol and a multi stage polymer
b) mixing the composition of previous step with the monomer (M1) chosen from a (meth) acrylic monomer or a vinyl monomer or mixture thereof wherein the liquid composition is having a dynamic viscosity at 20° C. between 10 mPa·s and 200 000 mPa·s.

Preferably the (meth) acrylic polymer (P1) has a mass average molecular weight Mw between 5000 g/mol and 70 000 g/mol. The (meth) acrylic polymer (P1) is the same as defined before.

The composition comprising the (meth) acrylic polymer (P1) and a multi stage polymer can be in form of the polymer powder as obtained by the two preferred embodiments of preparation.

The process yields to a liquid composition that is less viscous than a composition not comprising the (meth)acrylic polymer (P1) at the same level of multistage polymer.

The process yields to a liquid composition that possesses a better dispersion of the multistage polymer than a composition not comprising the (meth)acrylic polymer (P1).

The agglomerated polymer powder is better dispersed in the monomer (M1) when the (meth)acrylic polymer (P1) is present.

The process of the invention for manufacturing the liquid composition can be used to prepare a better dispersed multistage polymer than a composition not comprising the (meth)acrylic polymer (P1) and having an increased quantity of multistage polymer without increasing the viscosity than a composition not comprising the (meth)acrylic polymer (P1).

Another additional aspect of the invention is that the liquid composition comprising
- a) a (meth)acrylic polymer (P1),
- b) a multi stage polymer and
- c) monomer (M1) chosen from a (meth) acrylic monomer or a vinyl monomer or mixture thereof characterized that said liquid (meth)acrylic syrup is having a dynamic viscosity at 20° C. between 10 mPa·s and 200 000 mPa·s and that the (meth) acrylic polymer (P1) has a mass average molecular weight Mw of less than 100 000 g/mol, can be used for the preparation of the impact modified polymers and especially impact modified composite material, by polymerizing the (meth)acrylic monomer (M1).

The liquid composition according to the invention can also be mixed with other monomers and polymers that are not part of the liquid composition before polymerization. The liquid composition according to the invention can be used as a liquid masterbatch.

The multistage polymer is better distributed in the polymer matrix after polymerization instead than using a composition not comprising the (meth)acrylic polymer (P1).

Another additional aspect of the invention is a liquid composition comprising
- a) a (meth)acrylic polymer (P1),
- b) a multi stage polymer and
- c) monomer (M1) chosen from a (meth) acrylic monomer or a vinyl monomer or mixture thereof characterized that said liquid (meth)acrylic syrup is having a dynamic viscosity at 20° C. between 10 mPa·s and 200 000 mPa·s and that the (meth) acrylic polymer (P1) has a mass average molecular weight Mw of less than 100 000 g/mol, used in impregnation process for impregnating a fibrous substrate, wherein said fibrous substrate comprises long fibres and said process comprises a step of impregnating said fibrous substrate with the liquid composition.

Another additional aspect of the invention relates to an impregnation process for impregnating a fibrous substrate, wherein said fibrous substrate comprises long fibres and said process comprises a step of impregnating said fibrous substrate with a liquid composition comprising:
- a) a (meth)acrylic polymer (P1) having a mass average molecular weight Mw of less than 100 000 g/mol,
- b) a multistage polymer and
- c) a (meth)acrylic monomer (M1)

wherein the said liquid composition is having a dynamic viscosity at 20° C. between 10 mPa·s and 200 000 mPa·s.

Preferably said fibrous substrate comprises long fibres.

The liquid composition according to the invention can be used as a liquid masterbatch for the use as an impregnation liquid (meth) acrylic syrup or in an impregnation process for impregnating a fibrous substrate. The liquid composition is diluted with another monomer.

With regard to the fibrous substrate, one can mention fabrics, felts or nonwovens that may be in the form of strips, laps, braids, locks or pieces. The fibrous material can have different forms and dimensions either one dimensional, two dimensional or three dimensional. A fibrous substrate comprises an assembly of one or more fibres. When the fibres are continuous, their assembly forms fabrics.

The one dimensional form is linear long fibres. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two dimensional form are fibrous mats or non woven reinforcements or woven roving or bundles of fibers, which can also be braided.

The three dimensional form are for example stacked or folded fibrous mats or non woven reinforcements or bundles of fibers or mixtures thereof, an assembly of the two dimensional form in the third dimension.

The origins of the fibrous material can be a natural or a synthetic one. As natural material one can mention vegetable fibers, wood fibers, animal fibers or mineral fibers.

Natural fibers are for example sisal, jute, hemp, flax, cotton, coconut fibers, and banana fibers. Animal fibers are for example wool or hair.

As synthetic material one can mention polymeric fibers chosen from fibers of thermosetting polymers, from thermoplastic polymers or their mixtures.

The polymeric fibers can be made of polyamide (aliphatic or aromatic), polyester, polyvinylacohol, polyolefins, polyurethanes, polyvinylchloride, polyethylene, unsaturated polyesters, epoxy resins and vinylesters.

The mineral fibers can also be chosen from glass fibers especially of type E, R or S2, carbon fibers, boron fibers or silica fibers.

The fibrous substrate of the present invention is chosen from vegetable fibers, wood fibers, animal fibers, mineral fibers, synthetic polymeric fibers, glass fibers, carbon fibers or mixtures thereof.

Preferably the fibrous substrate is chosen from mineral fibers.

Still another aspect of the present invention is a manufacturing process for manufacturing mechanical or structured parts or articles comprising following steps:
- a) impregnating a fibrous substrate with the liquid composition or liquid (meth) acrylic syrup according to the invention,
- b) polymerising the liquid composition or liquid (meth) acrylic syrup impregnating said fibrous substrate.

With regard to the manufactured mechanical or structured parts or articles of the present invention, it comprises at least 20% by weight of fibrous substrate, preferable at least 40% by weight of fibrous material advantageously at least 50% by weight of fibrous material and advantageously at least 55% by weight of fibrous material based on the total composition.

The manufactured mechanical or structured parts or articles of the present invention, it comprises at most 99% by weight of fibrous material, preferable at most 95% by weight of fibrous material advantageously at most 90% by weight of fibrous material and advantageously at most 80% by weight of fibrous material based on the total composition.

With regard to manufacturing process for manufacturing mechanical or structured parts or articles comprising the polymeric composite material, several methods could be used in order to prepare three-dimensional mechanical or structured parts.

One can mention infusion, vacuum bag moulding, pressure bag molding, autoclave molding, resin transfer moulding (RTM), reaction injection molding (RIM) reinforced reaction injection molding (R-RIM) and variants thereof, press molding or compression molding.

With regard to the use of manufactured mechanical or structured parts or articles, one can mention automotive applications, nautical applications, railroad applications, sport, aeronautic and aerospace applications, photovoltaic applications, computer related applications, telecommunication applications and wind energy applications.

Particularly the three-dimensional mechanical or structured part is a automobile part, boat part, train part, sport article, plane or helicopter part, space ship or rocket part, photovoltaic module part, wind turbine part, furniture part, construction or building part, telephone or cell phone part, computer or television part, printer and photocopy part.

[Methods of Evaluation]

Viscosity Measurements

The viscosity is measured with a MCR 301 rheometer from Anton Paar. Couette geometry is used. Temperature is 20° C. and with a shear rate from 0.1 s−1 to 100 s−1.

Glass Transition Temperature

The glass transitions (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the viscoelastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

Particle Size Analysis

The particle size of the primary particles after the multistage polymerization is measured with a Zetasizer.

The particle size of the polymer powder after recovering is measured with Malvern Mastersizer 3000 from MALVERN. For the estimation of weight average powder particle size, particle size distribution and ratio of fine particles a Malvern Mastersizer 3000 apparatus with a 300 mm lenses, measuring a range from 0.5-880 μm is used.

EXAMPLES

Synthesis of multistage polymer (core-shell particles) is made according to the example of sample 1 of WO2012/038441 in order to obtain a multistage polymer. The multistage polymer CS1 is obtained. It comprises a stage (A) comprising a polymer (A1) having a glass transition temperature of less than 0° (essentially made of butyl acrylate) and a stage (B) comprising a polymer (B1) having a glass transition temperature of at least 30° C. (essentially made of methyl methacrylate). The obtained multistage polymer (CS1) is kept as an aqueous dispersion for further use.

Synthesis of a (meth)arylic polymer type (P1) is made according to two embodiments: first the (meth) acrylic polymer (P1) is polymerized in the presence of the multistage polymer CS1. The (meth) acrylic polymer (P1) is made as an additional stage of the multistage polymer CS. And in a second embodiment the (meth) acrylic polymer (P1) is polymerized apart and mixed or blended with the multistage polymer after the end of polymerization of the (meth) acrylic polymer (P1).

Comparative example 1 comprises no multistage polymer and is based in the composition from the example in WO2014/013028 with an adapted amount of polymer.

Example 1

The (meth) acrylic polymer (P1) is made as an additional stage on the multistage polymer CS1. The mass average molecular weight of the (meth)arylic polymer P1 is Mw 28 000 g/mol.

The final polymer composition comprising three stage was then recovered, the polymer composition being dried by spray drying. The obtained polymer composition is mixed with composition from comparative example 1 at 20° C. under agitation so that 10 wt % of CS1+P1 are in the liquid composition.

Example 2 example 1 is repeated, but 15 wt % of CS1+P1 in the liquid composition.

Comparative Example 2

The multistage polymer CS1 is dried and mixed with methyl methacrylate (MMA) at 20° C. under agitation so that 20 wt % of CS1 relatively to MMA are in the liquid composition.

Example 3

The dried polymer composition comprising the three stages is mixed with methyl methacrylate (MMA) at 20° C. under agitation so that 20 wt % of CS1+P1 relatively to MMA are in the liquid composition.

Example 4

The dried polymer composition comprising the three stages is mixed with methyl methacrylate (MMA) at 20° C. under agitation so that 25 wt % of CS1+P1 relatively to MMA are in the liquid composition.

The viscosity of the respective liquid compositions is measured.

TABLE 1 viscosity results liquid compositions

| Example | Sample | Dynamic Viscosity at 20° C. [Pa * s] at 1 s$^{-1}$ | Solid content of polymers (CS1 + P1) in composition [wt %] | Solid content of all polymers in composition [wt %] |
|---|---|---|---|---|
| Comparative example 1 | Without multistage polymer | 0.14 | 0 | 20 |
| Example 1 | With multistage polymer and P1 | 5.6 | 10 | 30 |
| Example 2 | With multistage polymer and P1 | 11.7 | 15 | 35 |

TABLE 1-continued viscosity results liquid compositions

| Example | Sample | Dynamic Viscosity at 20° C. [Pa * s] at 1 s$^{-1}$ | Solid content of polymers (CS1 + P1) in composition [wt %] | Solid content of all polymers in composition [wt %] |
|---|---|---|---|---|
| Comparative Example 2 | With multistage polymer | 5.3 | 20 | 20 |
| Example 3 | With multistage polymer and P1 | 1.4 | 20 | 20 |
| Example 4 | With multistage polymer and P1 | 12.4 | 25 | 25 |

As shown in table 1 the examples having a multistage polymer and (meth) acrylic polymer (P1) in the composition are more fluid at same level of multistage polymer or have the same viscosity at a higher global polymer content.

The exemplified compositions are polymerized or used for the impregnation of a fibrous substrate. Then they are polymerized in order to obtain an impact modified composite material.

The invention claimed is:

1. A liquid (meth)acrylic syrup composition comprising
   a) a (meth)acrylic polymer (P1),
   b) a multistage polymer and
   c) a monomer (M1) chosen from a (meth) acrylic monomer
      or a vinyl monomer or mixture thereof,
   wherein said liquid (meth)acrylic syrup has a dynamic viscosity at 20° C. between 10 mPa·s and 200,000 mPa·s and that the (meth) acrylic polymer (P1) has a mass average molecular weight Mw of less than 50,000 g/mol.

2. The liquid (meth)acrylic syrup of claim 1, for impregnating a fibrous substrate, said fibrous substrate consisting of long fibers.

3. The liquid composition according to claim 1 wherein the (meth) acrylic polymer (P1) has a mass average molecular weight Mw between 5000 g/mol and 50,000 g/mol.

4. The liquid composition according to claim 1 wherein the (meth) acrylic polymer (P1) has a mass average molecular weight Mw between 6,000 g/mol and 50,000 g/mol.

5. The liquid composition according to claim 1 wherein the multistage polymer to monomer (M1) ratio by weight in the liquid composition is between 2/98 and 24/76.

6. The liquid composition according to claim 1 wherein the composition or syrup further comprises d) an initiator or initiating system.

7. The liquid composition according to claim 1 wherein the (meth) acrylic polymer (P1) is soluble in the (meth) acrylic monomer (M1).

8. The liquid composition according to claim 1 wherein the monomer (M1) is selected from the group consisting of methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

9. The liquid composition according to claim 1 wherein the multi stage polymer comprises
   a) one stage (A) comprising a polymer (A1) having a glass transition temperature of less than 0° C., and
   b), one stage (B) comprising a polymer (B1) having a glass transition temperature of at least 30° C.

10. The composition according to claim 9, wherein the stage (A) is the first stage and that stage (B) comprising polymer (B1) is grafted on stage (A) comprising polymer (A1).

11. The composition according to claim 9 wherein the polymers (A1) and (B1) are acrylic or methacrylic polymers.

12. The composition according to claim 9 wherein the polymer (A1) comprises at least 50 wt % of polymeric units coming from isoprene or butadiene.

13. The liquid composition according claim 1 wherein the (meth) acrylic polymer (P1) comprises at least 50 wt % monomers chosen from C1 to C12 alkyl (meth)acrylates.

14. The liquid composition according to claim 1 wherein the (meth) acrylic polymer (P1) comprises from 50 wt % to 100 wt % methyl methacrylate, and from 0.2 wt % to 20 wt % of one or more C1 to C8 alkyl acrylate monomer.

15. The liquid composition according to claim 1 wherein the (meth) acrylic polymer (P1) comprises between 1 wt % and 50 wt % of a functional comonomer.

16. The liquid composition according to claim 1 wherein the (meth) acrylic polymer (P1) comprises between 1 wt % and 30 wt % of a functional comonomer.

17. The composition according to claim 15 wherein the functional comonomer is selected from the group consisting of glycidyl (meth)acrylate, acrylic acid, methacrylic acid, the amides derived from (meth)acrylic acid, dimethylacrylamide, 2-methoxyethyl acrylate, 2-methoxyethyl methacrylate, 2-aminoethyl acrylates optionally quaternized, 2-aminoethyl methacrylates optionally quaternized, acrylate or methacrylate monomers comprising a phosphonate or phosphate group, alkyl imidazolidinone (meth)acrylates, polyethylene glycol (meth)acrylates.

18. A process for manufacturing a liquid (meth)acrylic syrup composition of claim 1 comprising the steps of
   a) preparing a composition comprising a (meth) acrylic polymer (P1) having a mass average molecular weight Mw of less than 50,000 g/mol and a multi stage polymer,
   b) mixing the composition of previous step a) with a monomer (M1) chosen from a (meth) acrylic monomer or a vinyl monomer or mixture thereof;
   wherein the liquid composition is having a dynamic viscosity at 20° C. between 10 mPa·s and 200,000 mPa·s.

19. The process according to claim 18, wherein the (meth) acrylic polymer (P1) has a mass average molecular weight Mw between 5000 g/mol and 50,000 g/mol.

20. The process according to claim 18, wherein the (meth) acrylic polymer (P1) has a mass average molecular weight Mw between 6 000 g/mol and 50 000 g/mol.

21. The process according to claim 18 wherein the composition comprising a (meth) acrylic polymer (P1) having a mass average molecular weight Mw of less than 50,000 g/mol and a multi stage polymer is in form of a polymer powder.

22. An impregnation process for impregnating a fibrous substrate, wherein said fibrous substrate comprises long fibres and said process comprises a step of impregnating said fibrous substrate with a liquid composition comprising:
   a) a (meth)acrylic polymer (P1) having a mass average molecular weight Mw of less than 50,000 g/mol, b) a multistage polymer and
c) a monomer (M1) chosen from a (meth) acrylic monomer or a vinyl monomer or mixture thereof,
wherein the said liquid compositing is having a dynamic viscosity at 20° C. between 10 mPa·s and 200,000 mPa·s.

23. The impregnation process according to claim 22, wherein the composition further comprises d) at least one initiator or initiating system for starting the polymerization of the monomer.

24. The impregnation process according to claim 22 wherein the (meth)acrylic polymer (P1) has a mass average molecular weight Mw between 5000 g/mol and 50,000 g/mol.

25. The impregnation process according to claim 22 wherein the (meth)acrylic polymer (P1) has a mass average molecular weight Mw between 6,000 g/mol and 50,000 g/mol.

26. The liquid (meth)acrylic syrup composition according to claim 1 further comprising impact modifier.

* * * * *